(12) United States Patent
Li et al.

(10) Patent No.: US 10,975,910 B2
(45) Date of Patent: Apr. 13, 2021

(54) LINEAR MOTION MECHANISM, BALANCER DEVICE AND MACHINE TOOL

(71) Applicant: FANUC CORPORATION, Yamanashi (JP)

(72) Inventors: Zhenxing Li, Yamanashi-ken (JP); Hiroshi Minami, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/685,021

(22) Filed: Nov. 15, 2019

(65) Prior Publication Data
US 2020/0158174 A1 May 21, 2020

(30) Foreign Application Priority Data
Nov. 20, 2018 (JP) .............................. JP2018-217291

(51) Int. Cl.
*F16C 32/06* (2006.01)
*B23Q 1/70* (2006.01)

(52) U.S. Cl.
CPC .......... *F16C 32/0614* (2013.01); *B23Q 1/706* (2013.01)

(58) Field of Classification Search
CPC .. F16C 29/002; F16C 29/025; F16C 32/0614; F16C 32/0622; F16C 32/0625; F16C 32/0677; F16C 2322/39; B23Q 1/38; B23Q 1/4852; B23Q 1/4857; B23Q 1/4861; B23Q 1/4866; B23Q 1/4871; B23Q 1/4876; B23Q 1/488; B23Q 1/4885; B23Q 1/489; B23Q 1/4895; B23Q 1/706; B23Q 11/001; B23Q 11/0025
See application file for complete search history.

(56) References Cited

U.S. PATENT DOCUMENTS

| | | | | |
|---|---|---|---|---|
| 3,407,012 A | * | 10/1968 | Siebers | F16C 32/0659 384/118 |
| 3,711,167 A | * | 1/1973 | Ennis | F16C 32/06 384/12 |
| 3,717,392 A | * | 2/1973 | Ennis | B23Q 1/385 384/12 |

(Continued)

FOREIGN PATENT DOCUMENTS

| | | | | |
|---|---|---|---|---|
| GB | 2526340 A | * | 11/2015 | ............... B23Q 1/38 |
| JP | 2001105256 A | | 4/2001 | |

(Continued)

OTHER PUBLICATIONS

English Abstract and Machine Translation for Japanese Publication No. 2006-297504 A, published Nov. 2, 2006, 7 pgs.

(Continued)

*Primary Examiner* — Phillip A Johnson
(74) *Attorney, Agent, or Firm* — Fredrikson & Byron, P.A.

(57) ABSTRACT

A linear motion mechanism includes: a shaft; a base member having a through hole through which the shaft can be inserted; a static pressure bearing provided between the shaft disposed in the through hole and the base member to slidably support the shaft relative to the base member by introducing a pressurized fluid to the shaft; and an annular member provided between the static pressure bearing and the base member to elastically support the static pressure bearing.

3 Claims, 5 Drawing Sheets

(56) References Cited

U.S. PATENT DOCUMENTS

| | | | | |
|---|---|---|---|---|
| 4,080,009 A | * | 3/1978 | Marathe | B23Q 1/385 |
| | | | | 108/143 |
| 6,086,255 A | * | 7/2000 | Lyon | F16C 32/06 |
| | | | | 384/100 |
| 2010/0284638 A1 | * | 11/2010 | Hirata | F16C 32/0614 |
| | | | | 384/100 |

FOREIGN PATENT DOCUMENTS

| | | | |
|---|---|---|---|
| JP | 2006297504 A | 11/2006 | |
| JP | 2011020191 A | 2/2011 | |
| JP | 2011031338 A | 2/2011 | |
| JP | 2011161547 A | 8/2011 | |
| JP | 2018062037 A | 4/2018 | |
| WO | 2008023428 A1 | 2/2008 | |

OTHER PUBLICATIONS

English Abstract and Machine Translation for Japanese Publication No. JP2011-020191A, published Feb. 3, 2011, 13 pgs.
English Abstract and Machine Translation for Japanese Publication No. JP2018-062037A, published Apr. 19, 2018, 17 pgs.
English Abstract and Machine Translation for Japanese Publication No. JP2001-105256A, published Apr. 17, 2001, 15 pgs.
English Abstract and Machine Translation for International Publication No. WO2008/023428A1, published Feb. 28, 2008, 8 pgs.
English Abstract and Machine Translation for Japanese Publication No. JP2011-031338A, published Feb. 17, 2011, 16 pgs.
English Abstract and Machine Translation for Japanese Publication No. JP2011-161547A, published Aug. 25, 2011, 16 pgs.

\* cited by examiner

LINEAR MOTION MECHANISM, BALANCER DEVICE AND MACHINE TOOL

CROSS-REFERENCE TO RELATED APPLICATION

This application is based upon and claims the benefit of priority from Japanese Patent Application No. 2018-217291 filed on Nov. 20, 2018, the contents of which are incorporated herein by reference.

BACKGROUND OF THE INVENTION

Field of the Invention

The present invention relates to a balancer device that reduces the gravity acting on a slider slidable along a guide shaft, a machine tool having the balancer device, and a linear motion mechanism used in balancer devices and others.

Description of the Related Art

In a machine tool, a spindle head or the like is attached to a slider that can move along a vertical shaft for guidance in the vertical direction, therefore the gravity acting on the slider is liable to become large. To deal with this, a balancer device may be used in the machine tool.

For example, Japanese Laid-Open Patent Publication No. 2006-297504 discloses an aerostatic balancer in a machine tool, which includes a pneumatic cylinder to which a vertically movable spindle head is attached, a piston inserted in the pneumatic cylinder and an aerostatic bearing that supports the piston. This aerostatic balancer, by supplying high-pressure air into the pneumatic cylinder, alleviates the gravity load caused by the weight of the spindle head.

SUMMARY OF THE INVENTION

However, in assembling the aerostatic balancer of Japanese Laid-Open Patent Publication No. 2006-297504, if the axial center of the piston becomes inclined even a little amount relative to the axial center of the spindle head, the high-pressure air in the pneumatic cylinder blows out from the aerostatic bearing, which may cause the aerostatic balancer to be a troublesome vibration source. For this reason, it is required to adjust the axial center with high precision, but this adjustment tends to be difficult.

It is therefore an object of the present invention to provide a linear motion mechanism, a balancer device and a machine tool that can reduce difficulty in axial adjustment.

A first aspect of the present invention resides in a linear motion mechanism, comprising: a shaft; a base member having a through hole through which the shaft can be inserted; a static pressure bearing provided between the shaft disposed in the through hole and the base member and configured to slidably support the shaft relative to the base member by introducing a pressurized fluid to the shaft; and an annular member provided between the static pressure bearing and the base member and configured to elastically support the static pressure bearing.

A second aspect of the present resides in a balancer device including the above linear motion mechanism to reduce gravity acting on a slider that is movable along a guide shaft, comprising: a cylinder, fixed to the base member so as to cover one opening side of the through-hole, and having an interior space into which the shaft protruding from the opening is inserted; and a regulator, provided on a pipe connected to the interior space of the cylinder, and configured to adjust the gas pressure of the compressed gas in the interior space of the cylinder to a predetermined pressure. In this configuration, the shaft is arranged along the guide shaft, and the base member is fixed to the slider and configured to move together with the slider.

A third aspect of the present invention resides in a machine tool having the above balancer device, comprising: the guide shaft; the slider; and a driver configured to move the slider along the guide shaft.

According to the present invention, even if the axial center of the shaft is inclined from a predetermined specified position, the annular member deforms thanks to the pressurized fluid introduced from the static pressure bearing to the shaft. Thereby, the static pressure bearing moves to the position so as to keep the bearing movable along the axial center of the shaft. Therefore, it is possible to alleviate the difficulty in axial adjustment.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The present invention will be detailed below by describing a preferred embodiment with reference to the accompanying drawings.

Embodiment

Figure 1:
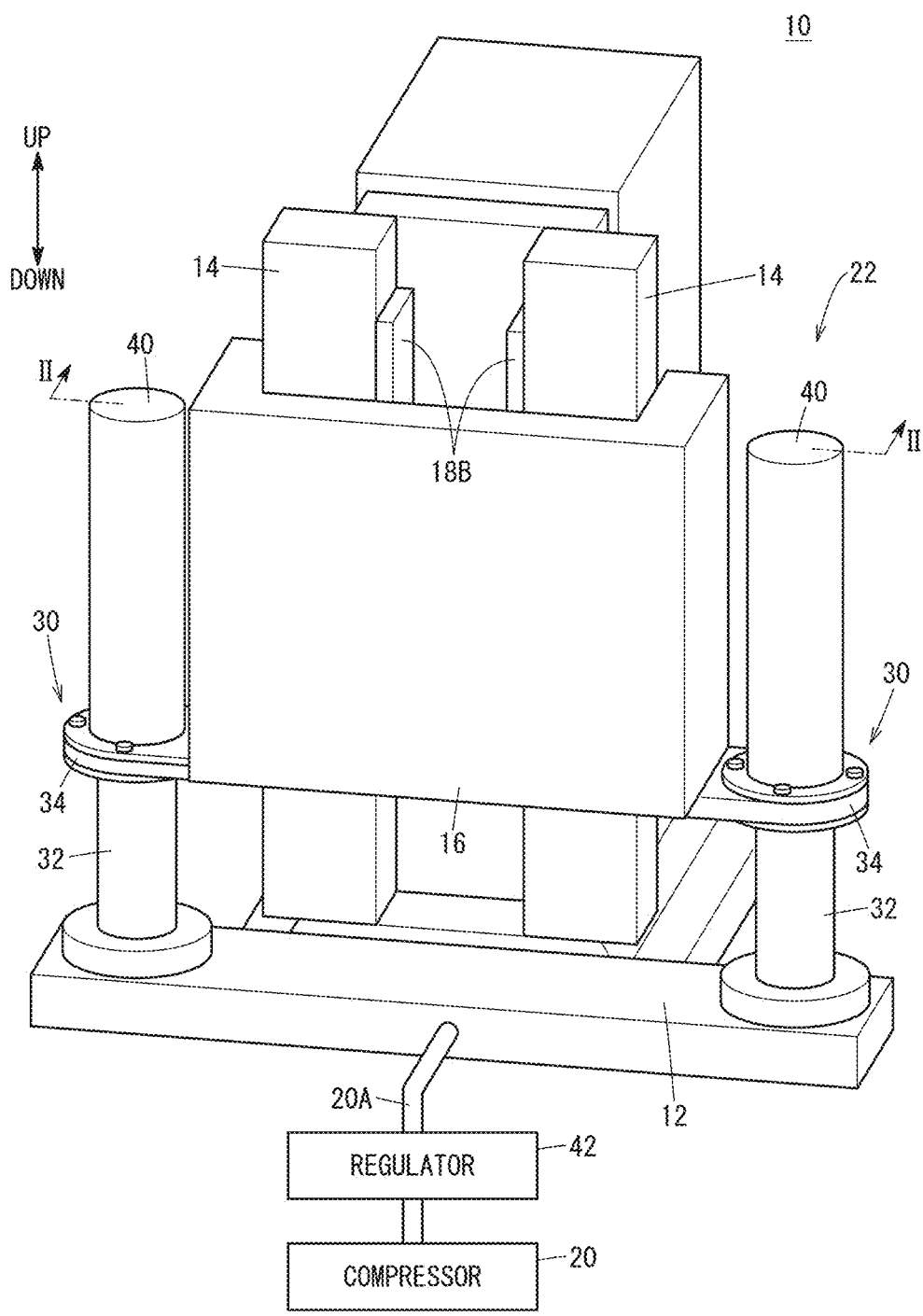
FIG. 1 is a schematic diagram showing a machine tool.
Figure 2:
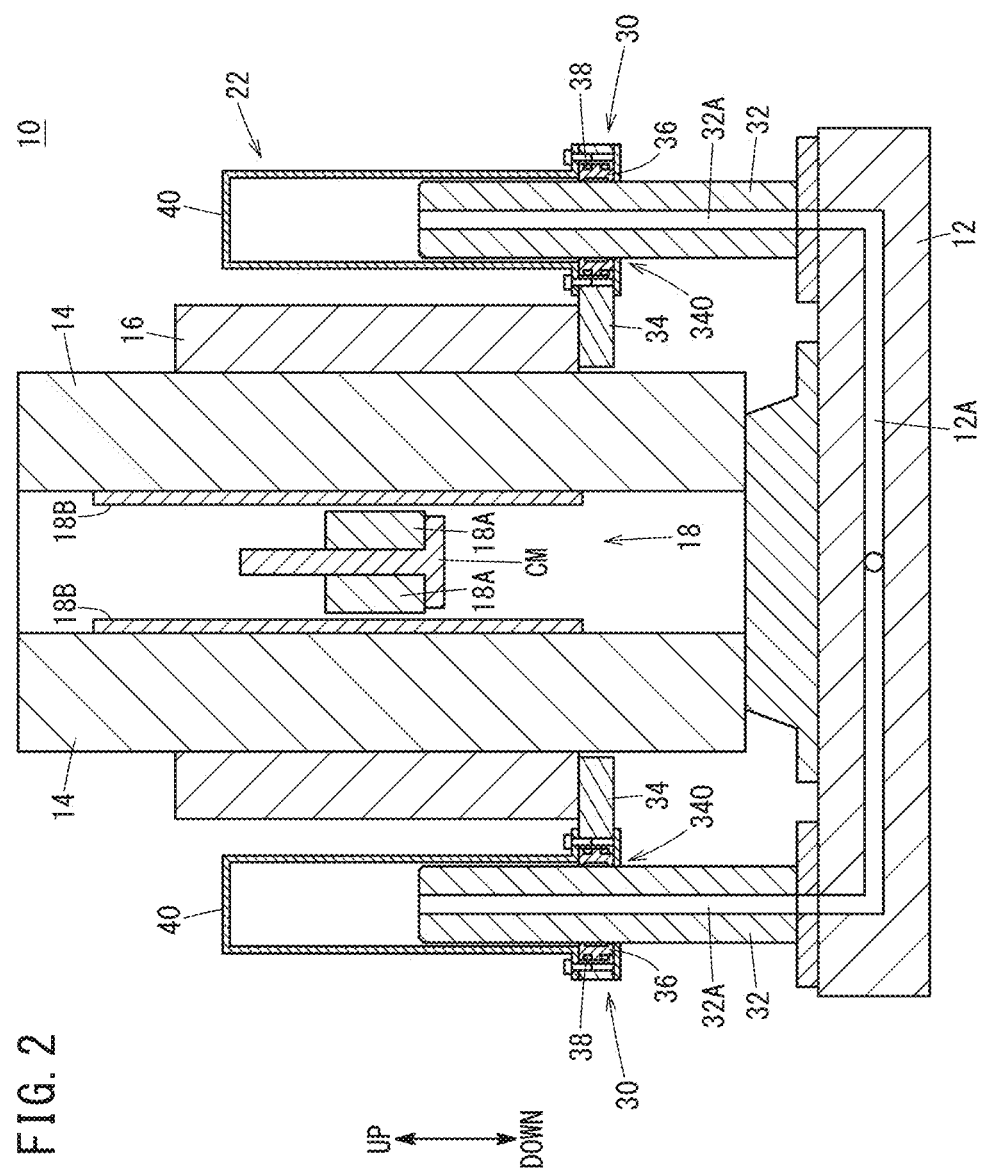
FIG. 2 is a sectional view taken along a line II-II in FIG. 1.

FIG. 1 is a schematic view showing a machine tool 10, and FIG. 2 is a sectional view taken along a line II-II in FIG. 1. In FIGS. 1 and 2, the up-and-down direction is shown. The downward direction is the direction in which gravity acts, and the upward direction is the direction opposite to the direction of gravity. The direction perpendicular to the up-and-down direction (vertical direction) is the horizontal direction.

As shown in FIGS. 1 and 2, a machine tool 10 includes a base 12, guide shafts 14, a slider 16, a driver 18 (see FIG. 2), a compressor 20 (see FIG. 1) and a balancer device 22.

The base 12 is a mount for mounting the guide shafts 14 and the balancer device 22. A flow passage 12A (see FIG. 2) for flowing a compressed gas output from the compressor 20 is formed in the base 12.

The guide shaft 14 is a shaft that guides the slider 16 and is fixed to the base 12. In the present embodiment, a pair of guide shafts 14 extend substantially parallel in the vertical direction (up-and-down direction). The number of guide shafts 14 may be one or three or more. Moreover, the guide shaft 14 may extend in a direction inclined with respect to the ground plane (horizontal plane).

The slider 16 is movable along the guide shafts 14. A spindle stock or the like is attached to the slider 16.

The driver 18 (see FIG. 2) moves the slider 16 along the guide shafts 14. In the present embodiment, the driver 18 is a linear motor having a pair of coils 18A and a pair of magnets 18B.

The paired coils 18A are attached to an attachment member CM fixed to the slider 16, and are disposed so as to oppose each other with the attachment member CM interposed therebetween. The paired magnets 18B are attached to respective guide shafts 14 and arranged so as to oppose each other along respective guide shafts 14. The driver 18 may include a motor and a power transmission mechanism having a ball screw and a nut that transmit the rotational force of the motor to the slider 16.

The compressor 20 compresses gas and outputs the compressed gas. One end of a pipe 20A of the compressor 20 is connected to the input end of the flow passage 12A formed in the base 12. Here, specific examples of gas include air and nitrogen.

Figure 3:
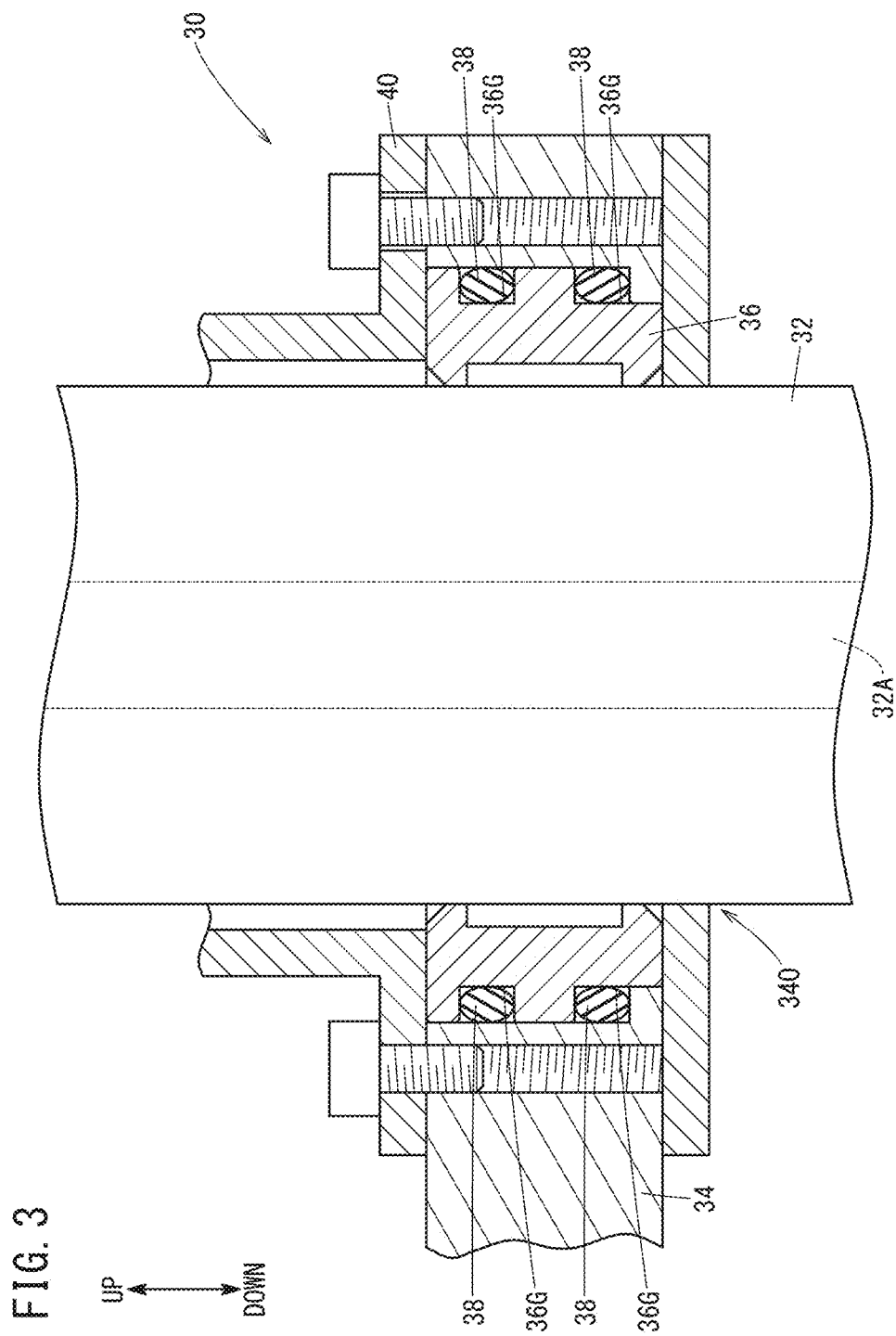
FIG. 3 is an enlarged view of a linear motion mechanism shown in FIG. 2.

The balancer device 22 reduces the effect of gravity acting on the slider 16 and includes a pair of linear motion mechanisms 30. The pair of linear motion mechanisms 30 are arranged symmetrically. Since the structures of the paired linear motion mechanisms 30 are the same, only the structure of one linear motion mechanism 30 will be described here. FIG. 3 is an enlarged view of the linear motion mechanism 30 of FIG. 2. As shown in FIGS. 2 and 3, the linear motion mechanism 30 includes a shaft 32, a base member 34, a static pressure bearing 36 and annular members 38.

The shaft 32 is fixed to the base 12 and is arranged along the guide shaft 14. The shaft 32 is arranged out of contact with the guide shaft 14 and is disposed on the opposite side across the guide shaft 14, from that of the magnet 18B. In the present embodiment, the shaft 32 is formed with a flow passage 32A in which the compressed gas output from the compressor 20 flows. The input end of the flow passage 32A is connected to the output end of the flow passage 12A formed in the base 12.

The base member 34 is fixed to the slider 16 so that it moves together with the slider 16. The base member 34 is formed in a plate shape, for example, and extends substantially horizontal from one end side that is fixed to the slider 16 toward the shaft 32. The base member 34 is formed with a through hole 340 through which the shaft 32 can be inserted.

The static pressure bearing 36 supports the shaft 32 slidably relative to the base member 34 by guiding a pressurized fluid to the shaft 32. That is, the static pressure bearing 36 can move in the axial direction of the shaft 32 by introducing a pressurized fluid to the shaft 32. The pressurized fluid is a compressed fluid and is supplied to the static pressure bearing 36 from the outside of the static pressure bearing 36. Specific examples of the fluid include air, nitrogen, other gases and lubrication oil. The pressurized fluid supplied to the static pressure bearing 36 may be the compressed gas output from the compressor 20.

The static pressure bearing 36 is arranged between the base member 34 and the shaft 32 disposed in the through hole 340 of the base member 34. Two annular grooves 36G (see FIG. 3) are formed on the outer peripheral side of the static pressure bearing 36. The two grooves 36G are formed apart from each other with respect to the direction (vertical direction) in which the shaft 32 extends.

The annular member 38 elastically supports the static pressure bearing 36, and is arranged between the base member 34 and the static pressure bearing 36. A specific example of the annular member 38 is a rubber O-ring. In the present embodiment, as shown in FIG. 3, one annular member 38 is arranged in each of two grooves 36G formed on the outer peripheral side of the static pressure bearing 36, and the thus arranged annular members 38 each support the static pressure bearing 36 elastically.

The annular members 38 support the static pressure bearing 36 elastically, hence deform due to the fluid fed from the static pressure bearing 36 to the shaft 32. Therefore, the annular members 38 can move the static pressure bearing 36 so that the bearing will follow the axial center of the shaft 32 even when the axial center of the shaft 32 is inclined relative to the guide shaft 14. That is, the static pressure bearing 36 can move in conformity with the inclination of the shaft 32 thanks to the deformation of the annular members 38 so as to keep the static pressure bearing 36 movable in the axial direction of the shaft 32. The arrangement of the annular members 38 in the grooves 36G on the outer peripheral side of the static pressure bearing 36 makes it easy to restrain the annular member 38 from being displaced in the direction in which the shaft 32 supported by the static pressure bearing 36 extends.

As shown in FIGS. 1 and 2, the balancer device 22 includes cylinders 40 and a regulator 42 (see FIG. 1) in addition to the linear motion mechanisms 30 described above.

The cylinder 40 is fixed to each of the pair of base members 34. Specifically, the cylinder 40 is fixed to the base member 34 so as to cover one opening side of the through hole 340 provided in the base member 34, and the shaft 32 protruding from the one opening is inserted, forming an interior space.

When the slider 16 moves along the guide shaft 14 by the driver 18, the base member 34 fixed to the slider 16 and the cylinder 40 fixed to the base member 34 move together with the slider 16. Specifically, the cylinder 40 moves up and down along the shaft 32 inserted in the interior space of the cylinder 40 as the slider 16 moves.

The interior space of the cylinder 40 is connected to the pipe 20A of the compressor 20 via the flow passage 12A formed in the base 12 and the flow passage 32A formed in the shaft 32. Therefore, the compressed gas output from the compressor 20 flows into the interior space of the cylinder 40 via the flow passages 12A and 32A. The compressed gas flowing into the interior space of the cylinder 40 is sealed by the static pressure bearing 36 and the annular members 38.

Specifically, the pressurized fluid that the static pressure bearing 36 leads to the shaft 32 seals the gap between the static pressure bearing 36 and the shaft 32 while the annular members 38 seal the gap between the annular members 38 and the base member 34. That is, the static pressure bearing 36 provides the function of sealing the interior space of the cylinder 40 in addition to the function of supporting the shaft 32 as described above. The annular members 38 has the function of supporting the static pressure bearing 36 while allowing the static pressure bearing 36 to move as described above and also provides the function of sealing the interior space of the cylinder 40.

The regulator 42 is provided on the pipe 20A of the compressor 20 and adjusts the gas pressure of the compressed gas in the interior space of the cylinder 40 to a predetermined level. The predetermined pressure is set depending on the weight of the slider 16 and the weight of members attached to the slider 16. That is, the pressure is set at a level equivalent to the gravity acting on the slider 16. Therefore, the regulator 42 can cancel or reduce the gravity acting on the slider 16 by the compressed gas in the interior space of the cylinder 40. As a result, the load on the driver 18 is reduced, so that the slider 16 can be smoothly moved by the driver 18.

MODIFICATIONS

Though the above embodiment has been described as one example of the present invention, the technical scope of the invention should not be limited to the above embodiment. It goes without saying that various modifications and improvements can be added to the above embodiment. It is also apparent from the scope of the claims that modes added with such modifications and improvements should be incorporated in the technical scope of the invention.

Modification 1

Figure 4:
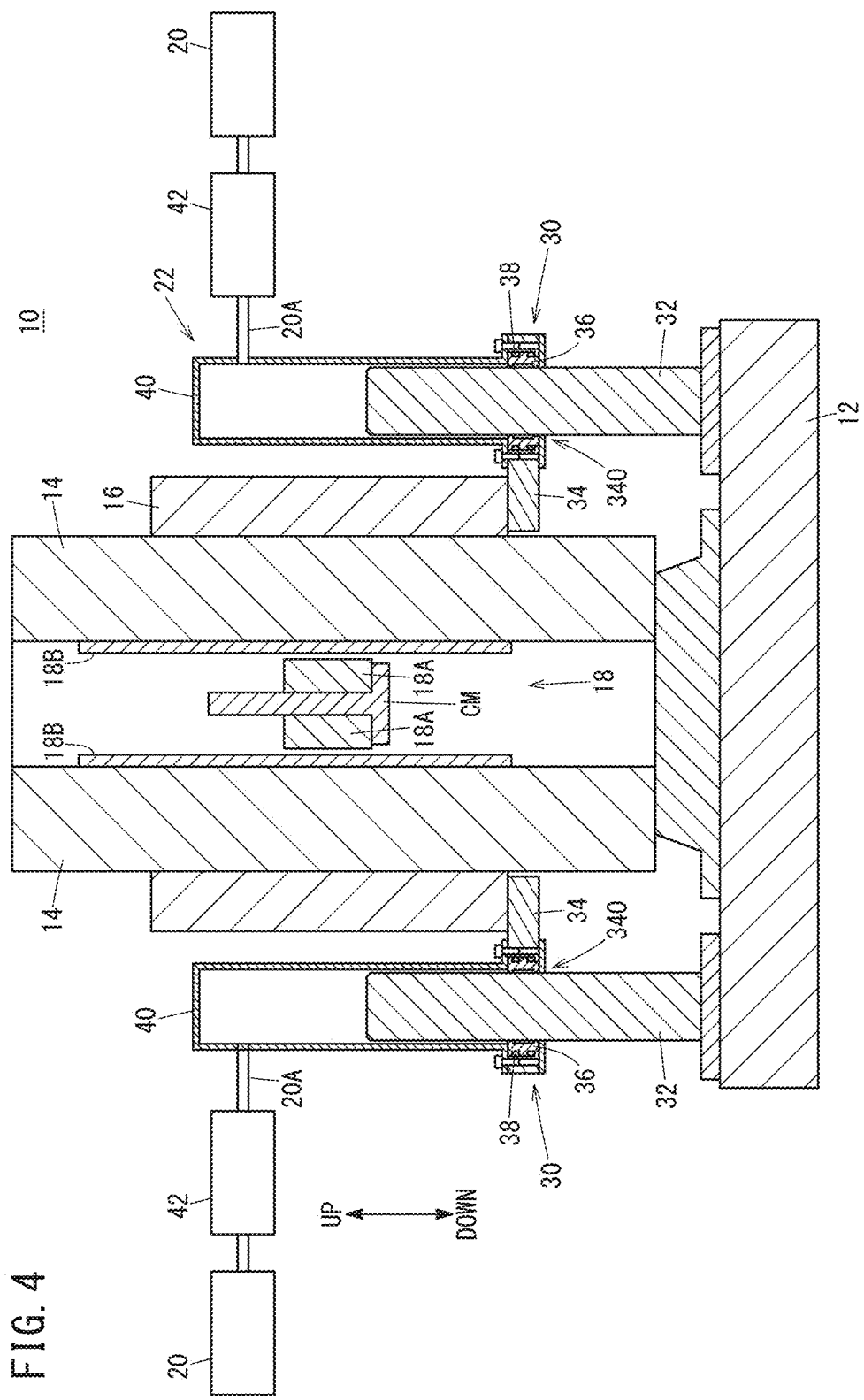
FIG. 4 is a sectional view showing a mode of a modification 1 from the same viewpoint as in FIG. 2.

FIG. 4 is a sectional view showing a mode of a modification 1 from the same viewpoint as in FIG. 2. In the balancer device 22 of the modification 1, the flow passage 12A of the base 12 and the flow passage 32A of the shaft 32 are unused, and one end of the pipe 20A is connected to the cylinder 40. That is, in the above embodiment, the pipe 20A is connected to the interior space of the cylinder 40 via the flow passage 12A of the base 12 and the flow passage 32A of the shaft 32, whereas the pipe 20A is directly connected to the interior space of the cylinder 40.

Thus, even if the pipe 20A is directly connected to the interior space of the cylinder 40, similarly to the above embodiment the gas pressure of the compressed gas inside the cylinder 40 can be adjusted to a predetermined pressure by the regulator 42.

Modification 2

Figure 5:
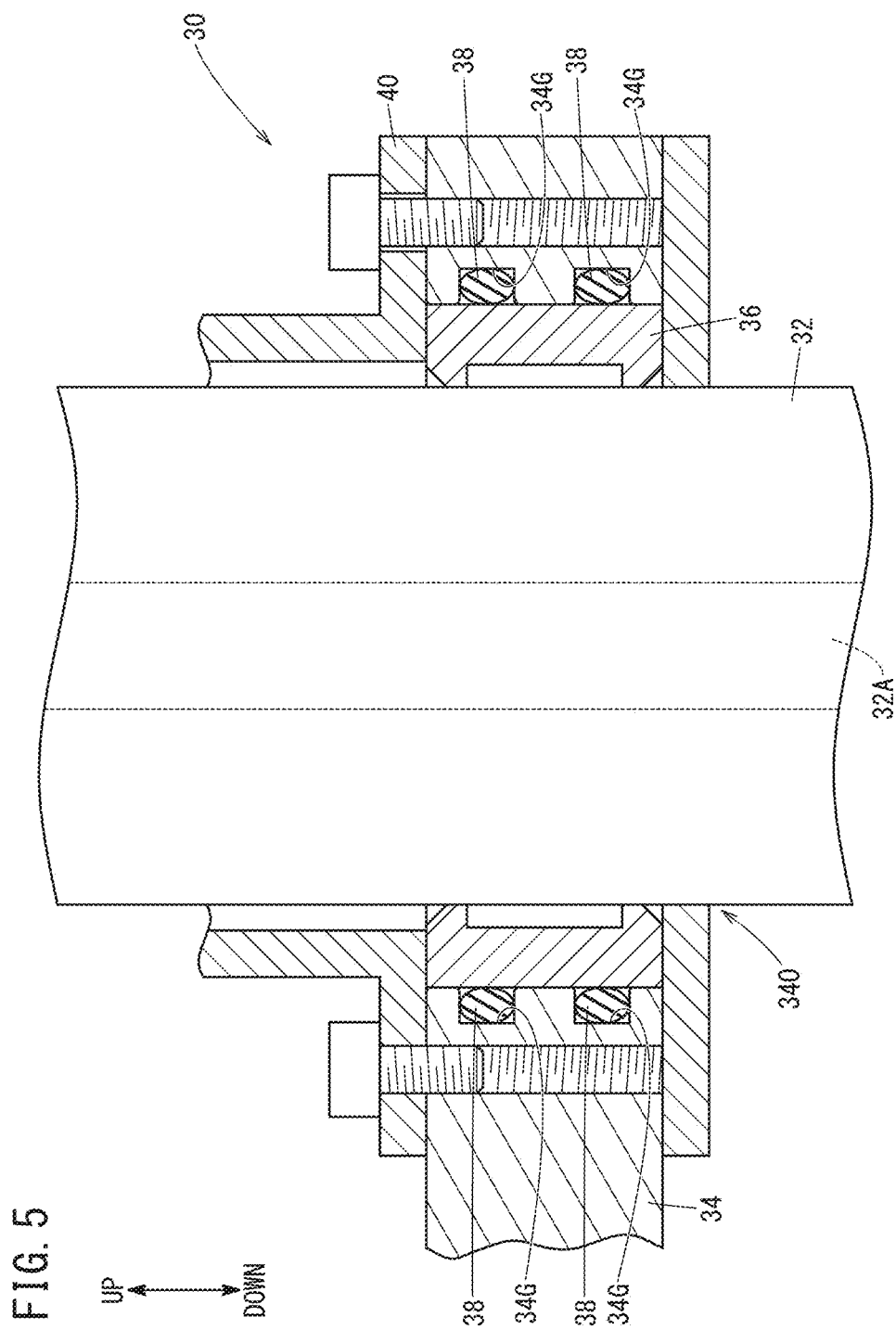
FIG. 5 is a sectional view showing a mode of a modification 2 from the same viewpoint as in FIG. 3.

FIG. 5 is a diagram showing a mode of a modification 2 from the same viewpoint as FIG. 3. In a linear motion mechanism 30 of the modification 2, two annular grooves 34G are formed on the base member 34 side surface that opposes the static pressure bearing 36. The two grooves 34G are formed apart from each other in the direction (vertical direction) in which the shaft 32 extends. An annular member 38 is arranged in each groove 34G.

Thus, even if the grooves 34G for receiving the annular members 38 are formed on the base member 34 side, it is possible to easily restrain the annular members 38 from being displaced in the direction in which the shaft 32 supported by the static pressure bearing 36 extends, as in the above embodiment. In the example shown in FIG. 5, the grooves 36G are not formed on the static pressure bearing 36 side, but may be formed on the bearing side. That is, if the grooves 36G or the grooves 34G are formed in at least one of the static pressure bearing 36 and the base member 34, it is possible to restrain displacement of the annular members 38.

Modification 3

In the above embodiment and the modification 2, the two grooves 36G and the two grooves 34G are formed, but one or three or more grooves may be provided. The grooves 36G and 34G may not be provided. Further, in the above embodiment and the modification 2, the grooves 36G and 34G are formed annularly, but need not necessarily be annular.

Moreover, in the above embodiment and the modification 2, each groove 36G or 34G is formed to accommodate one annular member 38, but may be formed to accommodate plural annular members 38.

Modification 4

In the above embodiment and modification 2, the number of the annular members 38 is two, but may be one or three or more. In addition, when there are plural annular members 38, the annular members 38 may be arranged apart from one another, or the annular members 38 may be arranged in contact with each other.

Modification 5

In the above embodiment, the linear motion mechanism 30 is used for the balancer device 22, but it may be applied to other than the balancer device 22.

Modification 6

The above embodiment and modifications 1 to 5 may be arbitrarily combined as long as no contradiction occurs.

Invention Obtained from the Embodiments

The invention that can be grasped from the above embodiment and modifications will be described below.

First Aspect of Invention

The first aspect of the invention relates to a linear motion mechanism (30), which includes: a shaft (32); a base member (34) including a through hole (340) through which the shaft (32) is configured to be inserted; a static pressure bearing (36) provided between the shaft (32) disposed in the through hole (340) and the base member (34) and configured to slidably support the shaft (32) relative to the base member (34) by introducing a pressurized fluid to the shaft (32); and an annular member (38) provided between the static pressure bearing (36) and the base member (34) and configured to elastically support the static pressure bearing (36).

In this linear motion mechanism (30), even if the axial center of the shaft (32) is inclined from a predetermined specified position, the annular member (38) deforms thanks to the pressurized fluid introduced from the static pressure bearing (36) to the shaft (32). Thereby, the static pressure bearing (36) can move to the position in which the bearing is movable along the axial center of the shaft (32). Therefore, according to the linear motion mechanism (30), it is possible to alleviate the difficulty in axial adjustment.

At least one of the static pressure bearing (36) and the base member (34) may be formed with a groove (34G, 36G) in which the annular member (38) is disposed. This makes it easier to prevent the annular member (38) from shifting in the direction in which the shaft (32) supported by the static pressure bearing (36) extends.

Second Aspect of Invention

The second aspect of the invention relates to a balancer device (22) including the above linear motion mechanism (30) to reduce the gravity acting on a slider (16) that is movable along a guide shaft (14). The balancer device (22) includes: a cylinder (40), fixed to the base member (34) so as to cover one opening side of the through-hole (340), and having an interior space into which the shaft (32) protruding from the opening is inserted; and a regulator (42), provided on a pipe (20A) connected to the interior space of the cylinder (40), and configured to adjust the gas pressure of the compressed gas in the interior space of the cylinder (40) to a predetermined pressure. The shaft (32) is arranged along the guide shaft (14), and the base member (34) is fixed to the slider (16) and configured to move together with the slider (16).

In this balancer device (22), even if the axial center of the shaft (32) is inclined with respect to the guide shaft (14), the annular member (38) deforms thanks to the pressurized fluid introduced from the static pressure bearing (36) to the shaft (32). Thereby, the static pressure bearing (36) can move to the position in which the bearing (36) is movable along the axial center of the shaft (32). Therefore, according to the balancer device (22), it is possible to alleviate the difficulty in axial adjustment.

Third Aspect of Invention

The third aspect of the invention relates to a machine tool (10) including the above balancer device (22) which includes: the guide shaft (14); the slider (16); and a driver (18) configured to move the slider (16) along the guide shaft (14).

Since the machine tool (10) has the balancer device (22), even if the axial center of the shaft (32) is inclined with respect to the guide shaft (14), the static pressure bearing (36) can move to the position in which the bearing is movable along the axial center of the shaft (32). Therefore, according to the machine tool (10), it is possible to alleviate the difficulty in axial adjustment.

The driver (18) may include a linear motor. Since the gravity acting on the slider (16) is reduced by the balancer device (22), the slider (16) can be smoothly moved by the linear motor.

What is claimed is:

1. A balancer device including a linear motion mechanism, comprising:
    a shaft;
    a base member including a through hole through which the shaft is configured to be inserted;
    a static pressure bearing provided between the shaft disposed in the through hole and the base member and configured to slidably support the shaft relative to the base member by introducing a pressurized fluid to the shaft; and
    an annular member provided between the static pressure bearing and the base member and configured to elastically support the static pressure bearing, wherein the balancer device reduces gravity acting on a slider that is movable along a guide shaft, comprising:
    a cylinder, fixed to the base member so as to cover one opening side of the through-hole, and having an interior space into which the shaft protruding from the opening is inserted; and
    a regulator, provided on a pipe connected to the interior space of the cylinder, and configured to adjust a gas pressure of the compressed gas in the interior space of the cylinder to a predetermined pressure, wherein:
    the shaft is arranged along the guide shaft; and
    the base member is fixed to the slider and configured to move together with the slider.

2. A machine tool including the balancer device according to claim 1, comprising:
    the guide shaft;
    the slider; and
    a driver configured to move the slider along the guide shaft.

3. The machine tool according to claim 2, wherein the driver comprises a linear motor.

* * * * *